(12) United States Patent
Rosemann et al.

(10) Patent No.: US 7,172,161 B2
(45) Date of Patent: Feb. 6, 2007

(54) HOLDER FOR ROD-LIKE OBJECTS SUCH AS PIPES OR CABLES

(75) Inventors: Frank Rosemann, Rockenberg (DE); Hans Peter Seng, Reiskirchen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/807,350

(22) Filed: Mar. 24, 2004

(65) Prior Publication Data

US 2004/0232287 A1 Nov. 25, 2004

(30) Foreign Application Priority Data

Mar. 25, 2003 (DE) ................. 103 13 411

(51) Int. Cl.
*F16L 3/22* (2006.01)
(52) U.S. Cl. .................. 248/68.1; 248/49; 248/71; 248/548; 248/909
(58) Field of Classification Search ............ 248/68.1, 248/71, 72, 73, 74.1, 65, 74.4, 74.2, 548, 248/909, 49; 403/341, 363, 375, 402, 379.6, 403/377; 385/53, 134
See application file for complete search history.

(56) References Cited

U.S. PATENT DOCUMENTS

| | | | |
|---|---|---|---|
| 5,040,345 A * | 8/1991 | Gilmour ................... 52/243.1 |
| 5,112,013 A | 5/1992 | Tolbert et al. ............. 248/74.3 |
| 5,184,794 A * | 2/1993 | Saito ......................... 248/68.1 |
| 5,799,907 A * | 9/1998 | Andronica ................... 248/62 |
| 5,803,414 A * | 9/1998 | Wright ....................... 248/74.4 |
| 5,920,036 A * | 7/1999 | Egger ..................... 174/161 F |
| 6,447,170 B1 * | 9/2002 | Takahashi et al. ............ 385/53 |
| 6,484,979 B1 * | 11/2002 | Medlin, Jr. ............... 248/205.1 |

FOREIGN PATENT DOCUMENTS

| | | |
|---|---|---|
| DE | 198 28 073 | 3/2000 |
| DE | 20001408 U1 * | 4/2000 |
| FR | 2 668 572 | 4/1992 |
| WO | WO 03/001069 | 1/2003 |

* cited by examiner

*Primary Examiner*—Korie Chan
(74) *Attorney, Agent, or Firm*—Miles & Stockbridge P.C.

(57) ABSTRACT

A holder for rod-like objects, such as pipes, cables or the like, has a holder portion and a slide which is pressed longitudinally into the holder portion. The holder portion has a pair of arms forming a trough into which the rod-like object is placed. The slide, forming an extension of the trough, has retaining elements that are moved by a wedging action when the slide is pushed into the holding portion, so as to contact the rod-like object to maintain its position on the holder.

19 Claims, 5 Drawing Sheets

HOLDER FOR ROD-LIKE OBJECTS SUCH AS PIPES OR CABLES

CROSS-REFERENCE TO RELATED APPLICATION

This application claims the benefit of German Application DE 103 13 411.5 filed Mar. 25, 2003, incorporated herein by reference.

BACKGROUND OF THE INVENTION

This invention relates to a holder for rod-like (elongated) objects, such as pipe, cables or the like, and is more particularly concerned with a holder that can be attached to a substrate, and that provides a trough in which a rod-like object is received and held in place in response to relative longitudinal movement of portions of the holder.

In a known holder for pipes or cables, as disclosed in WO 03/001069, a retaining element consists of a flap that is hinged to a holder arm, that is swung over an opening between holder arms to close the holder, and that is held in closed position by a resilient pawl.

DE 198 28 073 C1 discloses a cable holder of synthetic material for a vehicle, comprising a shank insertable in a hole in the bodywork of the vehicle and an elongated holder segment extending transverse thereto, to which a cable is fastened with a strap encircling the holder segment and the cable. An embodiment of a cable holder with a holding strap molded thereon is disclosed in U.S. Pat. No. 5,112,013.

BRIEF DESCRIPTION OF THE INVENTION

An object of the present invention is to provide an improved holder for rod-like objects, that is simple in structure and operation, and that is capable of withstanding heavy loads, such as vibratory loads, while maintaining security against inadvertent release of the held object.

A holder according to the invention provides a trough for receiving a rod-like object and that retains the rod-like object in the trough in response to relative longitudinal movement of portions of the holder.

In a preferred embodiment, a holder according to the invention comprises a first part, such as a U-shaped holding portion providing a trough for receiving a rod-like object, and a second part, more particularly a slide arranged for movement relative to the first part longitudinally of the trough.

In one embodiment, the second part is temporarily attached to the first part by a frangible connection that is easily broken when the second part is moved relative to the first part, e.g., by hand or by the aid of a simple tool.

In the preferred embodiment, the first part provides a guide for penetrative movement of the second part. Upon insertion of the second part into the first part, one or more retaining elements are made effective to retain a rod-like object on the holder.

An advantage of a holder according to the invention is that holding forces, emanating, for example from a held cable and acting on the retaining element, do not act along a direction of opening movement of the retaining element, and hence do not load the retaining element in an opening direction. The retaining element can therefore be reliably fixed in a closed position.

Another advantage of a holder according to the invention is that no hinges or hinge-like configurations are required to connect the retaining element to a holding portion. The holder may be produced economically as a one-piece configuration.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
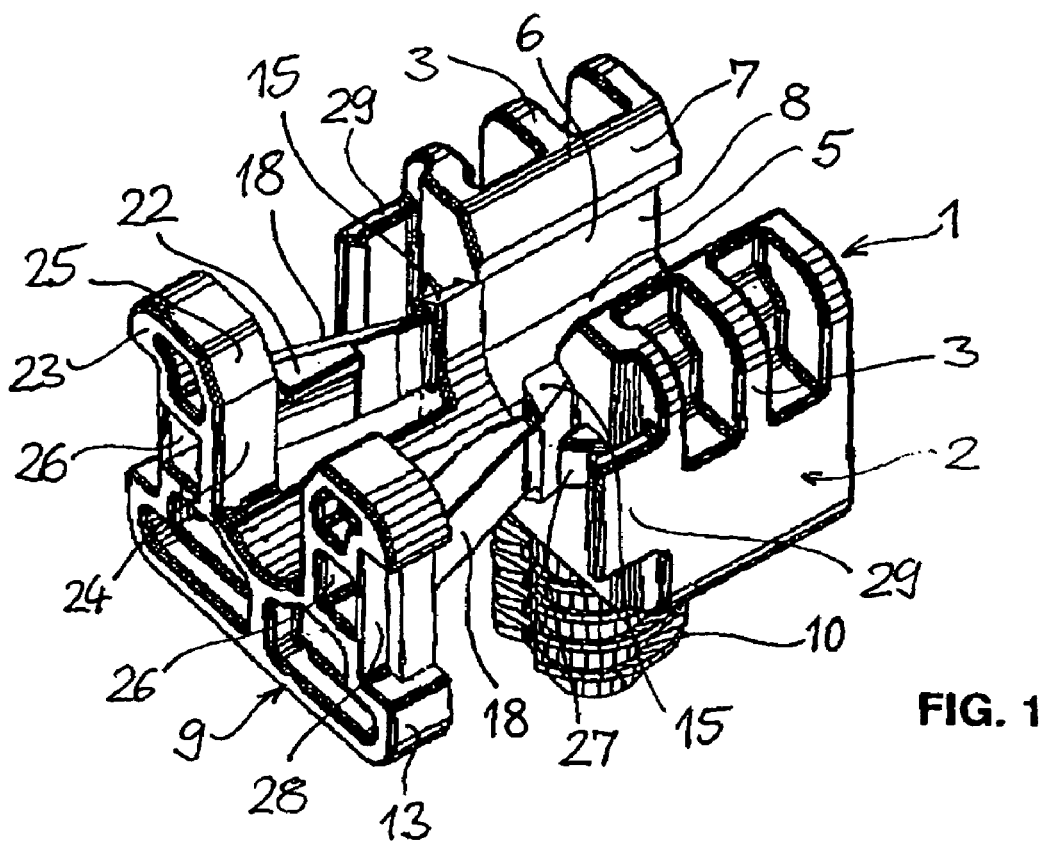
FIG. 1 shows a perspective representation of a first embodiment of the holder according to the invention, viewed obliquely from above.
Figure 2:
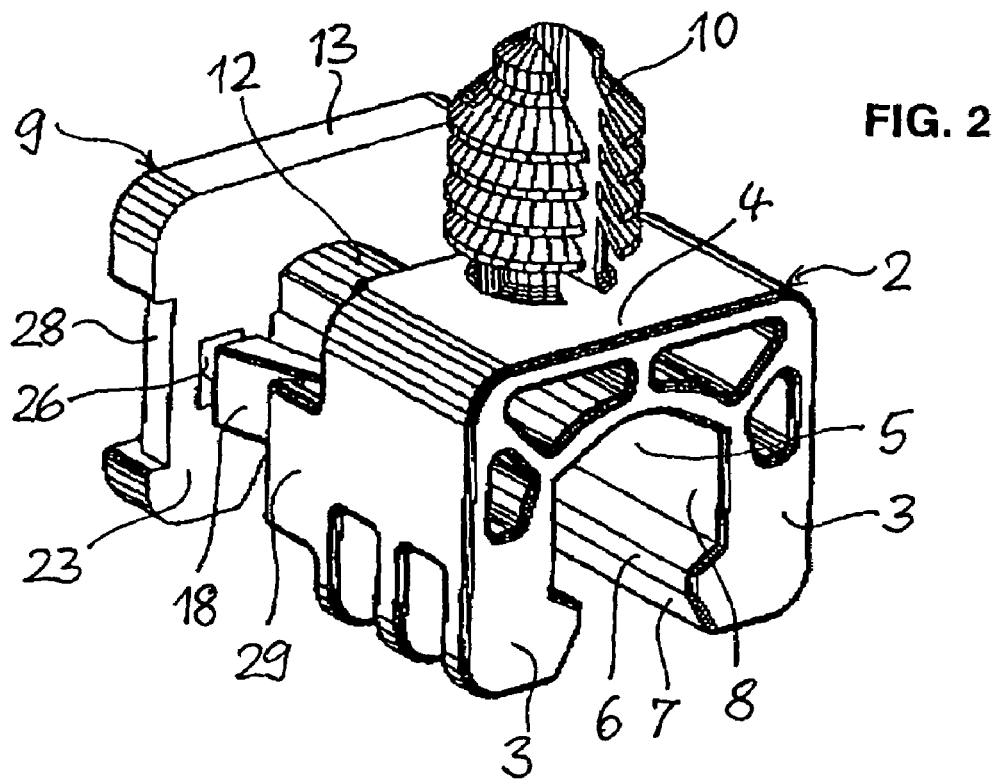
FIG. 2 shows a perspective representation of the holder according to FIG. 1, viewed obliquely from below.

FIGS. 1 to 6 show a holder 1 intended to fasten a cable, a bundle of cables or a pipe, for example, to a substrate, for example the bodywork of a motor vehicle.

The holder 1 comprises a first portion, namely a holding portion 2, with two symmetrical holder arms 3, extending at a distance from either side of a plane of symmetry and connected at one end by a holder foot 4. Between the holder arms 3 there is a trough 5 having an opening 6 located at the top of the holding portion 2. At the edges of the opening 6, bevels 7 are provided to facilitate introduction of a rod-like object, e.g., a pipe or cable, into the trough 5. In the two side walls of the trough 5, formed by the holder arms 3, a guide formed by prism-shaped guide grooves 8 are provided, serving to guide a second portion of the holder 1, namely, a slide 9.

On the under side of the holder foot 4, there is a mounting device 10, which, in the form shown, is of pinetree-like conformation. With the aid of the mounting device 10, the holder 1 can be anchored in a hole in a substrate.

Figure 3:
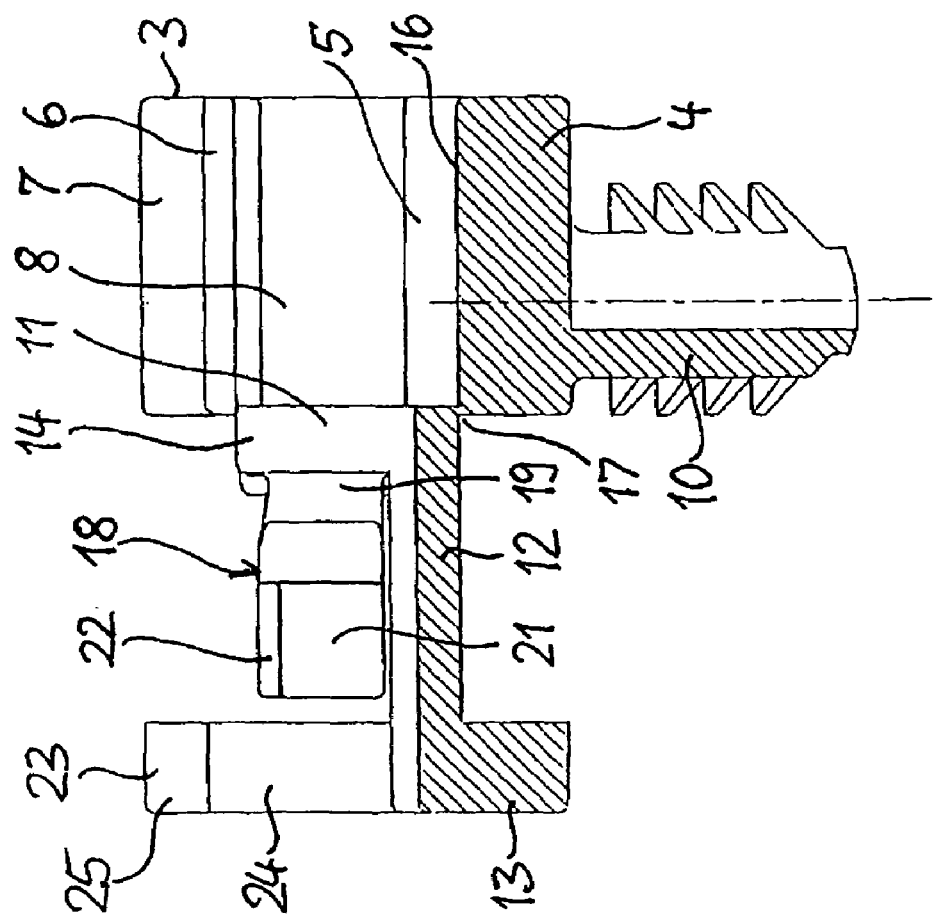
FIG. 3 shows a lengthwise section of the holder according to FIG. 1.
Figure 4:
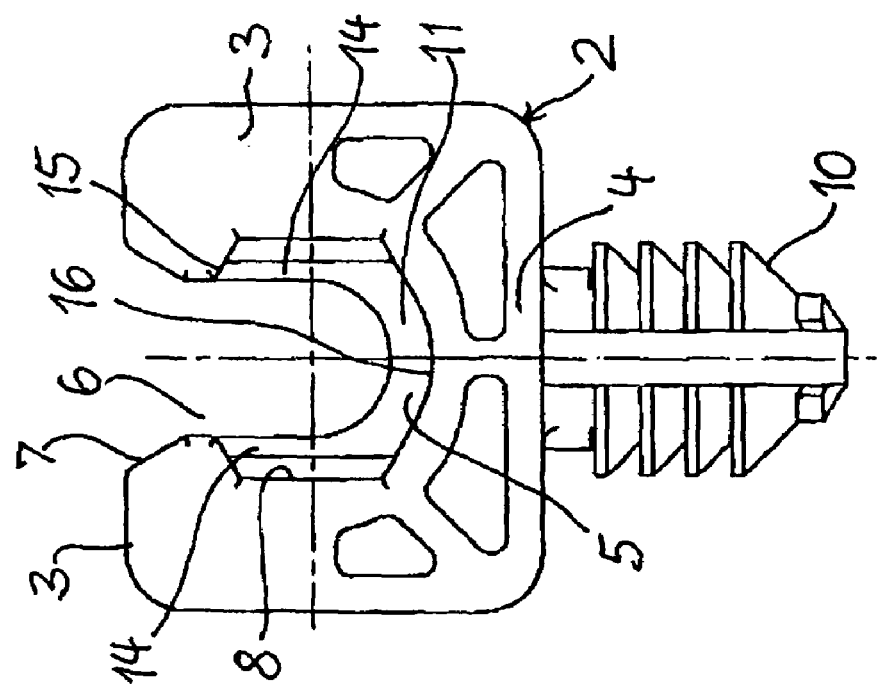
FIG. 4 shows a front view of the holder according to FIG. 1.
Figure 5:
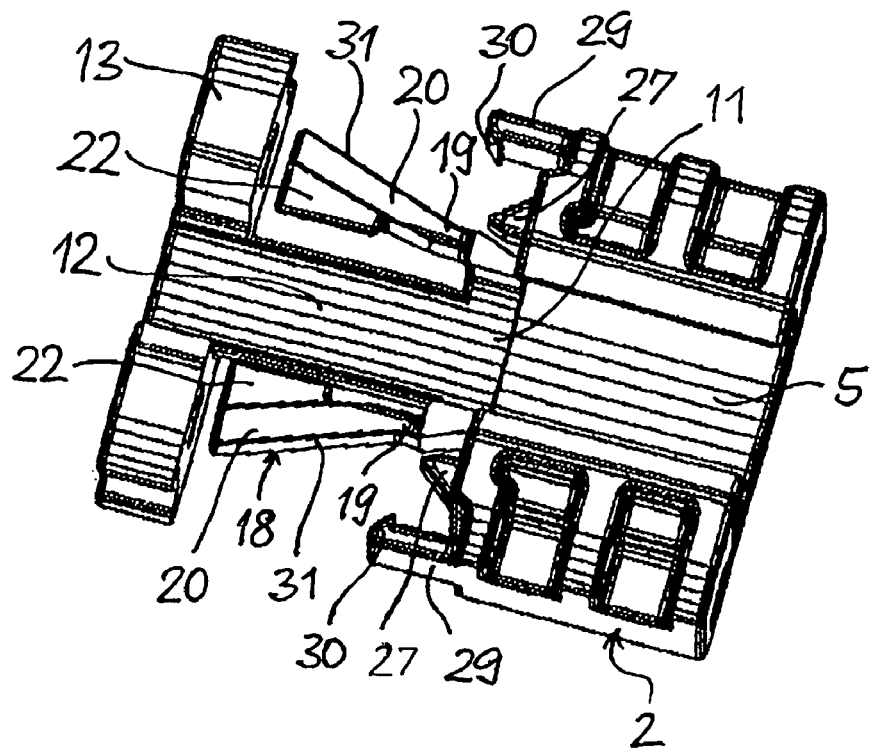
FIG. 5 shows a view of the holder according to FIG. 1 in an open position.

As shown in FIG. 3, the slide 9 comprises an anterior guide end 11, a midsection 12 and a posterior actuation end 13. The guide end 11 is U-shaped, and like the trough 5, is open at the top and ends. It comprises lateral guide segments 14 having guide surfaces 15 cooperating with the lateral guide surfaces of the guide grooves 8. As can be seen in FIG. 1, the slide 9 provides a longitudinal extension of the trough 5 of the holding portion 2.

As can be seen in FIG. 3, the guide end 11 is contiguous with the trough 5. The guide end 11 is connected to the holding portion 2 by frangible bridges 17. Hence, holding portion 2 and slide 9, in the initial position shown in FIGS. 1 to 5, form a one-piece part. The bridges 17 at the connections between the holding portion 2 and the slide 9, are so small that they can be easily broken by a force pressing the slide 9 into the holding portion 2.

The midsection 12 of the slide 9 is of about the same width as the opening 6. In each of spaces formed on either side of the midsection 12 in elongation of the guide grooves 8, a retaining element 18 is provided. Each retaining element 18 is attached by its anterior end to the adjacent guide segment 14 of the guide end 11. Between each of the retaining elements 18 and the guide segments 14, an elastically deformable strut 19 is provided, making possible a swinging motion of the retaining elements 18 about an axis running transverse to their length and substantially parallel to the plane of symmetry.

Each of the retaining elements 18 has a segment 20 (see FIG. 5) in the form of a ledge of approximately rectangular cross-section. Each segment 20 extends from the strut 19 towards the actuation end 13. The width of the segment 20 is somewhat smaller than the width of the guide grooves 8, and the thickness of the segment 20 is approximately equal to the depth of the guide grooves 8. The segments 20 can therefore be accommodated by the guide grooves 8. At its attachment end, each segment 20 is tapered by a bevel located on its inner side.

The segments 20 of the retaining elements 18 have movable posterior ends bearing a clamping jaw 21 (see FIG. 3), with a wedge-shaped rib 22 at its top edge, extending toward the plane of symmetry of the holder, its width increasing towards the actuation end 13. A surface of contact of the jaw 21 is curved at the point of transition to the rib 22.

In an open position shown in FIGS. 1 to 5, the retaining elements 18 are so arranged that their segments 20 form an angle open towards the actuation end 13. The mutually facing edges of the ribs 22 are substantially parallel, and their distance apart is approximately equal to the width of the opening 6.

The actuation end 13 of the slide 9 comprises two arms 23, extending parallel to the holder arms 3. Between the arms 23, there is a space 24 extending as far as the midsection 12 and having about the same width as the opening 6. At the open end of the space 24, insertion bevels 25 are provided, aligned with the insertion bevels 7. About in the middle, the arms 23 have rectangular openings 26 that serve to accommodate projections 27 that are provided on the holder arms 3 and that engage the openings 26 in a closed position of the slide 9, thereby assisting in supporting the slide 9 on the holding portion 2. The arms 23, on their outsides opposite to the space 24, are provided with undercut recesses 28. The recesses 28 accommodate spring tongues 29 (see FIG. 5) extending from the holder arms 3 towards the arms 23. At the free ends of the spring tongues 29, inward-directed sawtooth-like hooks 30 are provided, engaging the recesses 28 in the closed position of the slide 9 and snapping into the undercut portions of the recesses 28, to secure the slide 9 in the closed position.

The holder 1 is fabricated in the open position shown in FIGS. 1 to 5, constituting the initial position for receiving a pipe or cable, for example. The pipe or cable is laid in the trough 5 and in its longitudinal extension provided by the slide 9. Then sufficient pressure is applied to the actuation end 13 of the slide towards the holding portion 2 to break the bridges 17 between the guide end 11 and the holding portion 2, and the slide 9 is pushed into the trough 5.

The sides 31 of the retaining elements 18 are brought into contact with the projections 27 and pressed toward one another by a wedging action so that they can enter the guide grooves 8. In the closed position, the jaws 21 of the retaining elements 18 thus are placed in contact with a pipe or cable, for example, on opposed sides, to clamp it in place between them, and the ribs 22 overlie and contact the side of the pipe or cable facing the opening 6, whereby it is secured in the holder 2. The holding forces assumed by the retaining elements 18 are supported directly by holder arms 3 in the region of the guide grooves 8 and do not urge the slide 9 in an opening direction.

Figure 6:
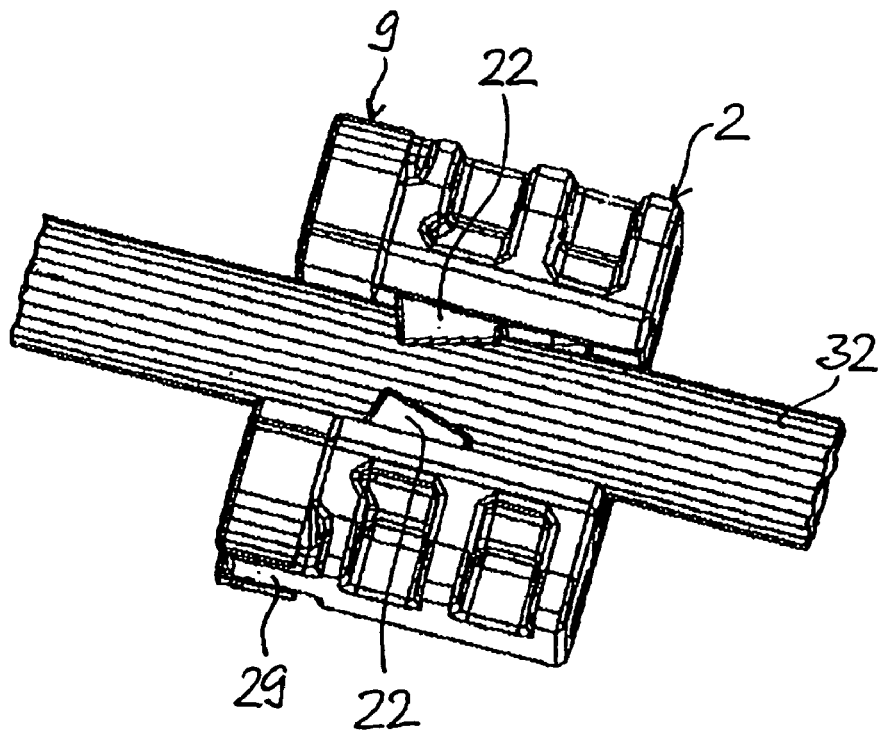
FIG. 6 shows a view of the holder according to FIG. 1 in a closed position, holding a cable.

In the closed position shown in FIG. 6, the ribs 22 overlie and contact a rod-like object 32. In the closed position, the arms 13 contact the holder arms 3, and the guide end 11 and midsection 12 of the slide 9 are located completely inside the holding portion 2. The spring tongues 29 (FIG. 5) engage the recesses 28 (FIG. 1) and, with the aid of the hooks 30, hold the slide 9 in that position. The slide 9 is secured against rotation relative to the holding portion 2 by the projections 27 entering the openings 26.

If the holder 1 is to be opened again, so that the rod-like object can be removed, it will suffice to push the two hooks 30 on the spring tongues 29 out of the undercut segments of the recesses 28 with the aid of a tool and then pull the slide 9 out of the holding portion 2 in an opening direction. Since the slide 9 became detached from the holding portion 2 as it was inserted into the holding portion, it can now be completely removed from the holding portion. As soon as the retaining elements 18 are drawn out of the holding portion, they return to their original position shown in FIGS. 1 and 5, and release the object. The holder 1 can then be used again for holding an object in the manner previously described.

Figure 7:
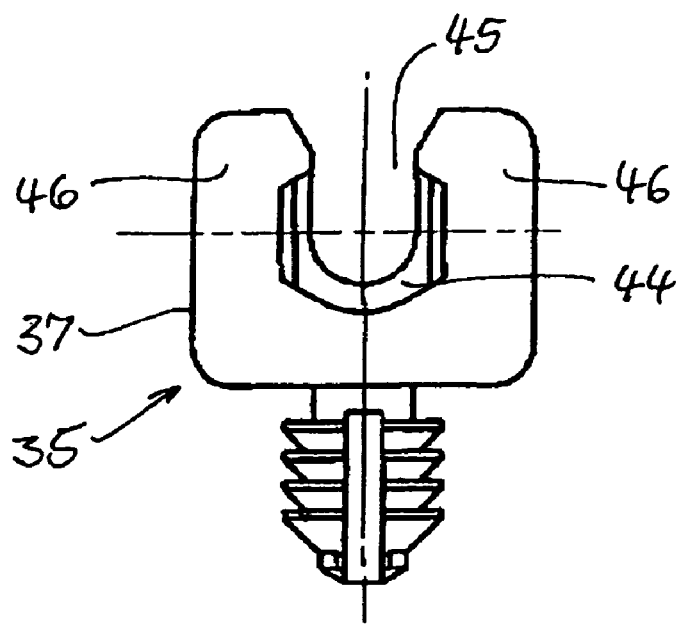
FIG. 7 shows a front view and FIG. 8 shows a top view of a second embodiment of a holder according to the invention.
Figure 8:
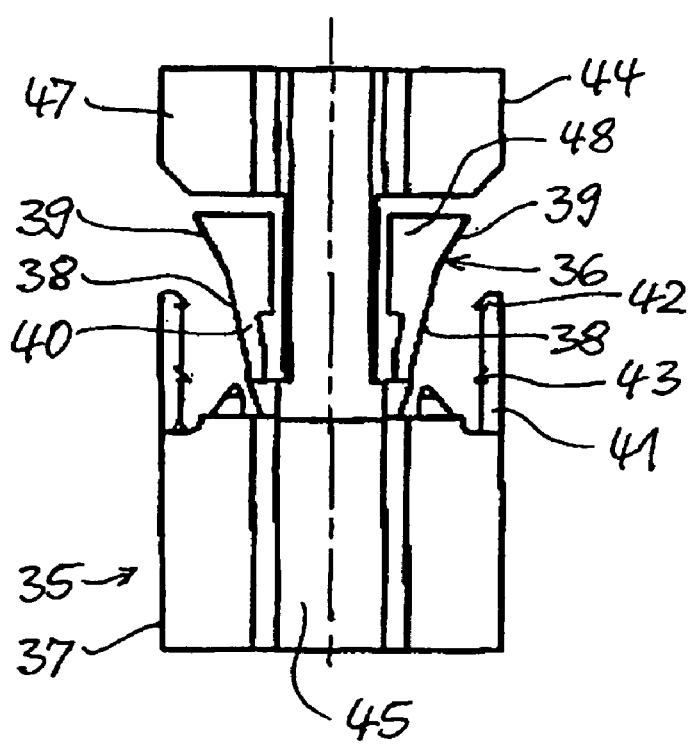

The holder 35 shown in FIGS. 7 and 8 is similar in basic structure to the holder 1. In the following, therefore, only features differing from the holder 1 will be discussed. In the case of the holder 35, each of the retaining elements 36 is provided on its posterior side 38 supported on the holding portion 37 with an inclined or wedge-shaped ramp 39. The ramps 39 are located at the posterior movable end of the retaining elements 36. The angle of the ramps 39 to the lengthwise axis of the holder 35 is distinctly greater than the angle made by the posterior side 38 of the anterior segments 40 of the retaining elements 36 with the lengthwise axis of the holder. The holding portion 37 of the holder 35 also comprises prolonged spring tongues 41 each having two sawtooth-like hooks 42, 43 arranged at a distance from one another and serving to secure the slide 44 in two different axial positions.

Figure 9:
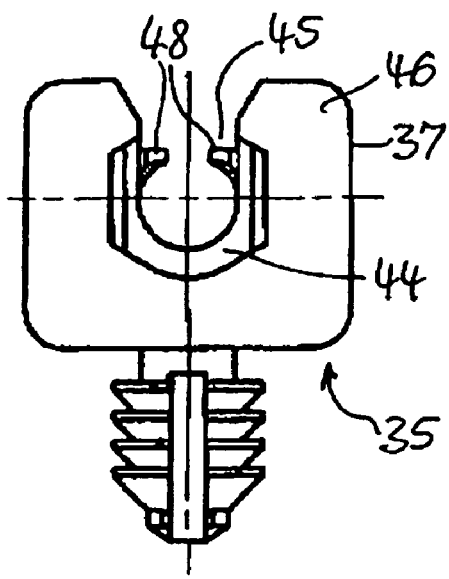
FIGS. 9a and 9b show the holder according to FIGS. 7 and 8 in a first closed position.

With the holder 35, thicker and thinner pipes or cables, for example, can be secured. FIGS. 9a, 9b show the closed position for securing pipes or cables whose diameter about equals the width of the opening 45 between the holder arms 46. In this position, the actuation end 47 is located at a distance from the holding portion 37, being prevented by the hooks 42 from returning to the open position according to FIG. 8. The retaining elements 36 engage the guide grooves of the holding portion 37 by their segments 40 only, while the ribs 48 of the retaining elements 36 protrude into the opening 45 far enough so that a pipe or cable of a diameter corresponding to the width of the opening is held securely.

Figure 10:
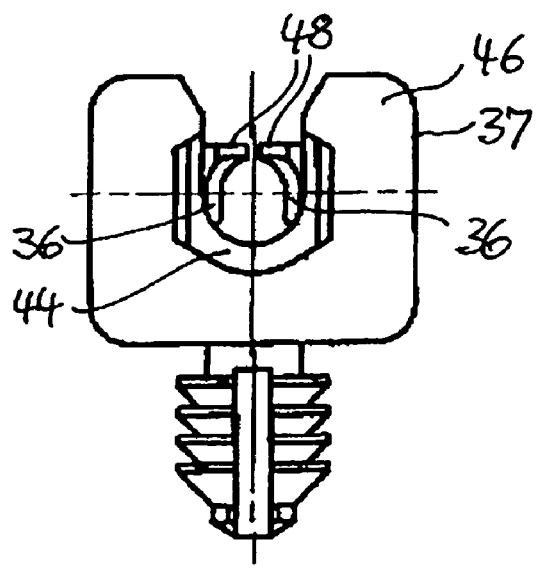
FIGS. 10a and 10b show the holder according to FIGS. 7 and 8 in a second closed position.
Figure 9:
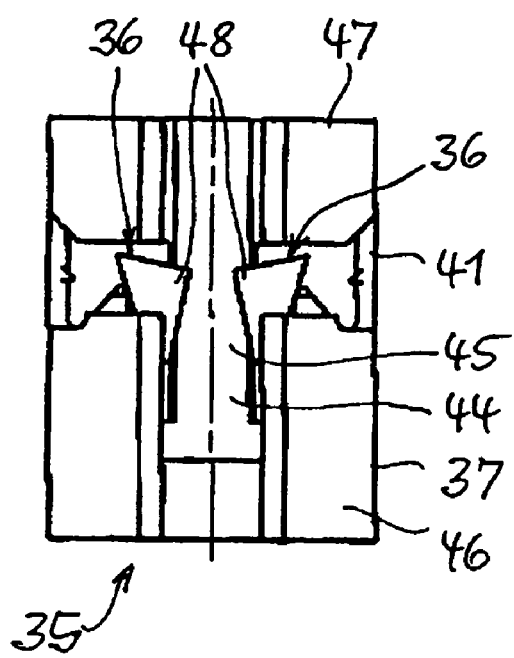
Figure 10:
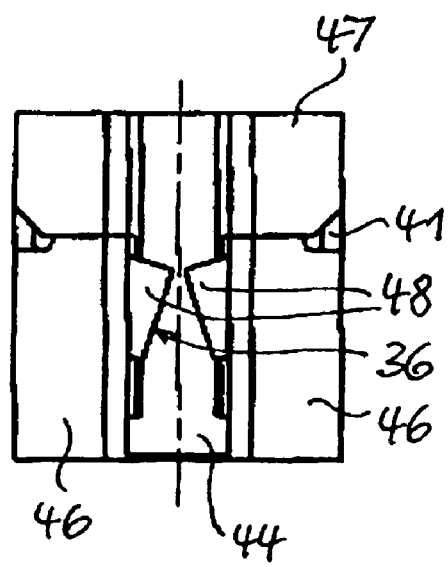

To secure pipes or cables of smaller diameter, the slide 44 can be moved as far as its stop position in the holding portion 37, as shown in FIGS. 10a, 10b. In this operation, the retaining elements 36 with their ramps 39 are drawn completely into the guide grooves of the holding portion 37. In this way, the ramps 39 supported on the holder arms 46 press the retaining elements closer together, so that between them, only a smaller opening persists, almost completely closed to the outside by the ribs 48, approximately touching one another. Thus, pipes or cables of smaller diameter are securely held.

While preferred embodiments of the invention have been shown and described, it will be apparent that modifications can be made without departing from the principles and spirit of the invention, the scope of which is defined in the appended claims. For example, surfaces of the holder may be provided with an adhesion layer of a soft synthetic material or of rubber to contact a held rod-like object.

What is claimed is:

1. A holder for elongated objects, such as pipes or cables, having a mounting portion for attaching the holder to a substrate, a pair of holder arms fixedly connected to one another at one end and providing a U-shaped holding portion with a trough open at the top to receive and support an elongated object longitudinally in the trough along a longitudinal axis of the trough parallel to a bottom wall of the trough, and having a slide defining a longitudinal extension of the trough along the longitudinal axis to receive and support the object longitudinally, wherein the slide has a retaining element movable from an open position to a closed position in response to movement of the slide longitudinally into the trough along the longitudinal axis, wherein, in the closed position, the retaining element at least partly closes an opening between free ends of the holder arms, wherein the U-shaped holding portion comprises a guide extending longitudinally of the trough between the arms of the holding portion along the longitudinal axis to guide the slide for movement longitudinally into the trough along the longitudinal axis, and the retaining element, in the open position, is located at least partly outside of the holding portion at one end of the guide, and is located inside the guide in the closed position.

2. A holder for elongated objects, such as pipes or cables, having a mounting portion for attaching the holder to a substrate, a pair of holder arms fixedly connected to one another at one end and providing a U-shaped holding portion with a trough open at the top to accommodate an elongated object longitudinally in the trough, and having a slide with a retaining element movable from an open position to a closed position in response to movement of the slide longitudinally of the trough, wherein, in the closed position, the retaining element at least partly closes an opening between free ends of the holder arms, wherein the U-shaped holding portion comprises a guide extending longitudinally of the trough of the holding portion to guide the slide for movement longitudinally along the trough, and the retaining element, in the open position, is located at least partly outside of the holding portion at one end of the guide, and is located inside the guide in the closed position, characterized in that the retaining element is connected to the holding portion in a position corresponding to the open position by bridges of material that can readily be broken when the retaining element is moved to the closed position.

3. A holder for elongated objects, such as pipes or cables, having a mounting portion for attaching the holder to a substrate, a pair of holder arms fixedly connected to one another at one end and providing a U-shaped holding portion with a trough open at the top to receive and support an elongated object longitudinally in the trough, and having a slide defining a longitudinal extension of the trough to receive and support the object longitudinally, wherein the slide has a retaining element movable from an open position to a closed position in response to movement of the slide longitudinally into the trough, wherein, in the closed position, the retaining element at least partly closes an opening between free ends of the holder arms, wherein the U-shaped holding portion comprises a guide extending longitudinally of the trough between the arms of the holding portion to guide the slide for movement longitudinally into and along the trough, and the retaining element, in the open position, is located at least partly outside of the holding portion at one end of the guide, and is located inside the guide in the closed position, characterized in that the retaining element comprises a wedge-shaped segment located outside of a longitudinal projection of the opening in the open position, and entering the opening through displacement of the retaining element to the closed position and at least partially closing the opening, in order thereby to secure in place an elongated object present in the trough.

4. A holder for elongated objects, such as pipes or cables, having a mounting portion for attaching the holder to a substrate, a pair of holder arms fixedly connected to one another at one end and providing a U-shaped holding portion with a trough open at the top to receive and support an elongated object longitudinally in the trough, and having a slide defining a longitudinal extension of the trough to receive and support the object longitudinally, wherein the slide has a retaining element movable from an open position to a closed position in response to movement of the slide longitudinally into the trough, wherein, in the closed position, the retaining element at least partly closes an opening between free ends of the holder arms, wherein the U-shaped holding portion comprises a guide extending longitudinally of the trough between the arms of the holding portion to guide the slide for movement longitudinally into and along the trough, and the retaining element, in the open position, is located at least partly outside of the holding portion at one end of the guide, and is located inside the guide in the closed position, characterized in that the retaining element is connected at an anterior end to an anterior end of the slide and is movable relative to the slide by pressure on a posterior end of the slide to move the slide into the guide in the holding portion.

5. A bolder for elongated objects, such as pipes or cables, having a mounting portion for attaching the holder to a substrate, a pair of holder arms fixedly connected to one another at one end and providing a U-shaped holding portion with a trough open at the top to accommodate an elongated object, and having a retaining element movable from an open position to a closed position, in which it at least partly closes an opening between free ends of the holder arms, characterized in that the U-shaped holding portion comprises a guide extending longitudinally of the trough of the holding portion, and the retaining element, in the open position, is located at least partly outside of the holding portion at one end of the guide, and is located inside the guide in the closed position, characterized in that the retaining element is movably held on a slide movable longitudinally in the guide of the holding portion, characterized in that the retaining element is connected at an anterior end to an anterior end of the slide and is movable relative to the slide by pressure on a posterior end of the slide to move the slide into the guide in the holding portion, and characterized in that the connection between the anterior end of the retaining element and the anterior end of the slide comprises an elastically deformable segment which holds the retaining element in the open position, and, upon movement of the slide to the closed position, makes possible the closing movement of the retaining element by elastic deformation.

6. A holder according to claim 1, characterized in that the retaining element on an upper edge has a rib disposed to overlie and contact an elongated object in the closed position.

7. A holder for elongated objects, such as pipes or cables, having a mounting portion for attaching the holder to a substrate, a pair of holder arms fixedly connected to one another at one end and providing a U-shaped holding portion with a trough open at the top to receive and support an elongated object longitudinally in the trough, and having a slide defining a longitudinal extension of the trough to receive and support the object longitudinally, wherein the slide has a retaining element movable from an open position to a closed position in response to movement of the slide longitudinally into the trough, wherein, in the closed position, the retaining element at least partly closes an opening between free ends of the holder arms, wherein the U-shaped holding portion comprises a guide extending longitudinally of the trough between the arms of the holding portion to guide the slide for movement longitudinally into and along the trough, and the retaining element, in the open position, located at least partly outside of the holding portion at one end of the guide, and is located inside the guide in the closed position,
characterized in that the retaining element has the shape of a wedge connected by its thinner end to the anterior end of the slide.

8. A holder for elongated objects, such as pipes or cables, having a mounting portion for attaching the holder to a substrate, a pair of holder arms fixedly connected to one another at one end and providing a n-shaped holding portion with a trough open at the top to receive and support an elongated object longitudinally in the trough, and having a slide defining a longitudinal extension of the trough to receive and support the object longitudinally, wherein the slide has a retaining element movable from an open position to a closed position in response to movement of the slide longitudinally into the trough, wherein, in the closed position, the retaining element at least partly closes an opening between free ends of the holder arms, wherein the U-shaped holding portion comprises a guide extending longitudinally of the trough between the arms of the holding portion to guide the slide for movement longitudinally into and along the trough, and the retaining element, in the open position, is located at least partly outside of the holding portion at one end of the guide, and is located inside the guide in the closed position,
characterized in that the holding portion of the holder comprises a prism-shaped guide groove engaged by a guide segment configured at an anterior end of the slide.

9. A holder according to claim 1, characterized in that the slide at a posterior end comprises arms opposed to the holder arms and contacting the holder arms in the closed position.

10. A holder according to claim 9, characterized in that, on the holder arms and/or on arms of the slide, catches or latches operative in the closed position are provided, to secure the slide in the closed position.

11. A holder for elongated objects, such as pipes or cables, having a mounting portion for attaching the holder to a substrate, a pair of holder arms fixedly connected to one another at one end and providing a U-shaped holding portion with a trough open at the top to accommodate an elongated object, and having a retaining element movable from an open position to a closed position, in which it at least partly closes an opening between free ends of the holder arms, characterized in that the U-shaped holding portion comprises a guide extending longitudinally of the trough of the holding portion, and the retaining element, in the open position, is located at least partly outside of the holding portion at one end of the guide, and is located inside the guide in the closed position,
characterized in that the retaining element is movably held on a slide movable longitudinally in the guide of the holding portion,
characterized in that the slide at a posterior end comprises arms opposed to the holder arms and contacting the holder arms in the closed position, and
characterized in that, on the holder arms or on the arms of the slide, spring tongues are arranged, bearing hooks at their free ends, grasping the slide and/or the holding portion in the closed position.

12. A holder according to claim 1, characterized in that the slide is fastenable to the holding portion in two closed positions arranged at a distance from one another.

13. A holder according to claim 1, characterized in that the holder is symmetrically configured with respect to a plane of symmetry dividing the trough longitudinally and is provided with two retaining elements opposed to one another.

14. A holder according to claim 1, characterized in that surfaces of the holder, disposed to contact an elongated object, are provided with an adhesion layer of a soft synthetic material or of rubber.

15. A holder for an elongated object, comprising:
a first part defining a trough for receiving and supporting the object longitudinally along a longitudinal axis of the trough parallel to a bottom wall of the trough, wherein the trough has an opening at a top thereof opposite to the bottom wall and is substantially U-shaped in cross-section; and
a second part defining a trough that has an opening at a top thereof opposite to a bottom wall thereof and is substantially U-shaped in cross-section and that is a longitudinal extension of the trough of the first part along the longitudinal axis for also receiving and supporting the object longitudinally,
wherein the second part is a slide constructed so that the second part can be moved longitudinally into the trough of the first part along the longitudinal axis, and wherein the second part has a retaining element that moves transversely across the troughs and over the object to hold the object on the holder in response to insertion of the second part into the trough of the first part.

16. A holder according to claim 15, wherein the retaining element is moved to a closed position by a wedging action as the second part moves into the trough of the first part.

17. A holder according to claim 15, wherein the first part has a mounting element below its trough for attaching the first part to a substrate.

18. A holder for an elongated object, comprising:
a first part defining a trough for receiving the elongated object longitudinally; and
a second part defining an extension of the trough of the first part for also receiving the elongated object longitudinally,
wherein the second part is a slide constructed so that the second part can be moved longitudinally into the trough of the first part, and wherein the second part has a retaining element that moves over the object to hold the object on the holder in response to insertion of the second part into the trough of the first part, and
wherein the second part is initially connected to the first part by frangible elements that are broken in response to pressure exerted on the second part to move the second part into the trough of the first part.

19. A holder according to claim 15, wherein the first and second parts have cooperable fastening elements for fastening the second part to the first part upon insertion of the second part into the trough of the first part.

* * * * *